US008438777B2

(12) United States Patent
Uhlik

(10) Patent No.: US 8,438,777 B2
(45) Date of Patent: May 14, 2013

(54) REPEATING LIVE CATCH ANIMAL TRAP

(76) Inventor: Matthew J. Uhlik, Greenleaf, KS (US)

( * ) Notice: Subject to any disclaimer, the term of this patent is extended or adjusted under 35 U.S.C. 154(b) by 452 days.

(21) Appl. No.: 12/757,171

(22) Filed: Apr. 9, 2010

(65) Prior Publication Data

US 2010/0257772 A1    Oct. 14, 2010

Related U.S. Application Data

(60) Provisional application No. 61/168,131, filed on Apr. 9, 2009.

(51) Int. Cl.
*A01M 23/10* (2006.01)

(52) U.S. Cl.
USPC .......................... 43/72; 43/70; 43/69; 43/71

(58) Field of Classification Search ............... 43/72, 70, 43/69, 71, 64, 61
See application file for complete search history.

(56) References Cited

U.S. PATENT DOCUMENTS

| 223,324 | A | * | 1/1880 | Driscoll | 43/70 |
|---|---|---|---|---|---|
| 1,217,056 | A | * | 2/1917 | Pickering | 43/70 |
| 1,503,480 | A | * | 8/1924 | Cobbs | 43/70 |
| 1,600,347 | A | * | 9/1926 | Martin | 43/70 |
| 1,668,367 | A | * | 5/1928 | Hentschel | 43/70 |
| 1,798,717 | A | | 3/1931 | Baranski | |
| 1,810,608 | A | | 6/1931 | Jacobs | |
| 1,856,980 | A | | 5/1932 | Weaver | |
| 1,914,972 | A | | 6/1933 | Judge | |
| 2,163,577 | A | | 6/1939 | Allen | |
| 2,564,134 | A | * | 8/1951 | Streed | 43/70 |
| 2,677,912 | A | | 5/1954 | McQuien | |
| 2,733,541 | A | | 2/1956 | McKim | |
| 2,763,092 | A | | 9/1956 | Sheridan | |
| 2,780,024 | A | | 2/1957 | McKim | |
| 6,938,368 | B2 | * | 9/2005 | Guidry | 43/69 |
| 8,205,377 | B1 | * | 6/2012 | Wilson | 43/69 |
| 2006/0026893 | A1 | * | 2/2006 | Sears | 43/69 |

* cited by examiner

*Primary Examiner* — Christopher P Ellis
(74) *Attorney, Agent, or Firm* — Jeffrey L. Thompson; Thompson & Thompson, P.A.

(57) ABSTRACT

A live catch animal trap has a trap floor positioned above an animal holding cage, a bait station positioned adjacent to the trap floor, and a mechanical trigger mechanism. The trap floor is rotatably moveable between a generally horizontal closed position and a downwardly inclined open position. The trap floor is normally biased toward its closed position by a return spring and/or its center of gravity location relative to its pivot point. The trigger mechanism is arranged to be tripped by an animal standing on the trap floor as the animal attempts to access the bait station. The trigger mechanism has a trip plate connected to a locking element that engages a spring-loaded latch on the trap floor. The trip plate and the locking element are arranged to automatically return the trigger mechanism to an untripped condition as the trap floor returns from its open position to its closed position.

16 Claims, 5 Drawing Sheets

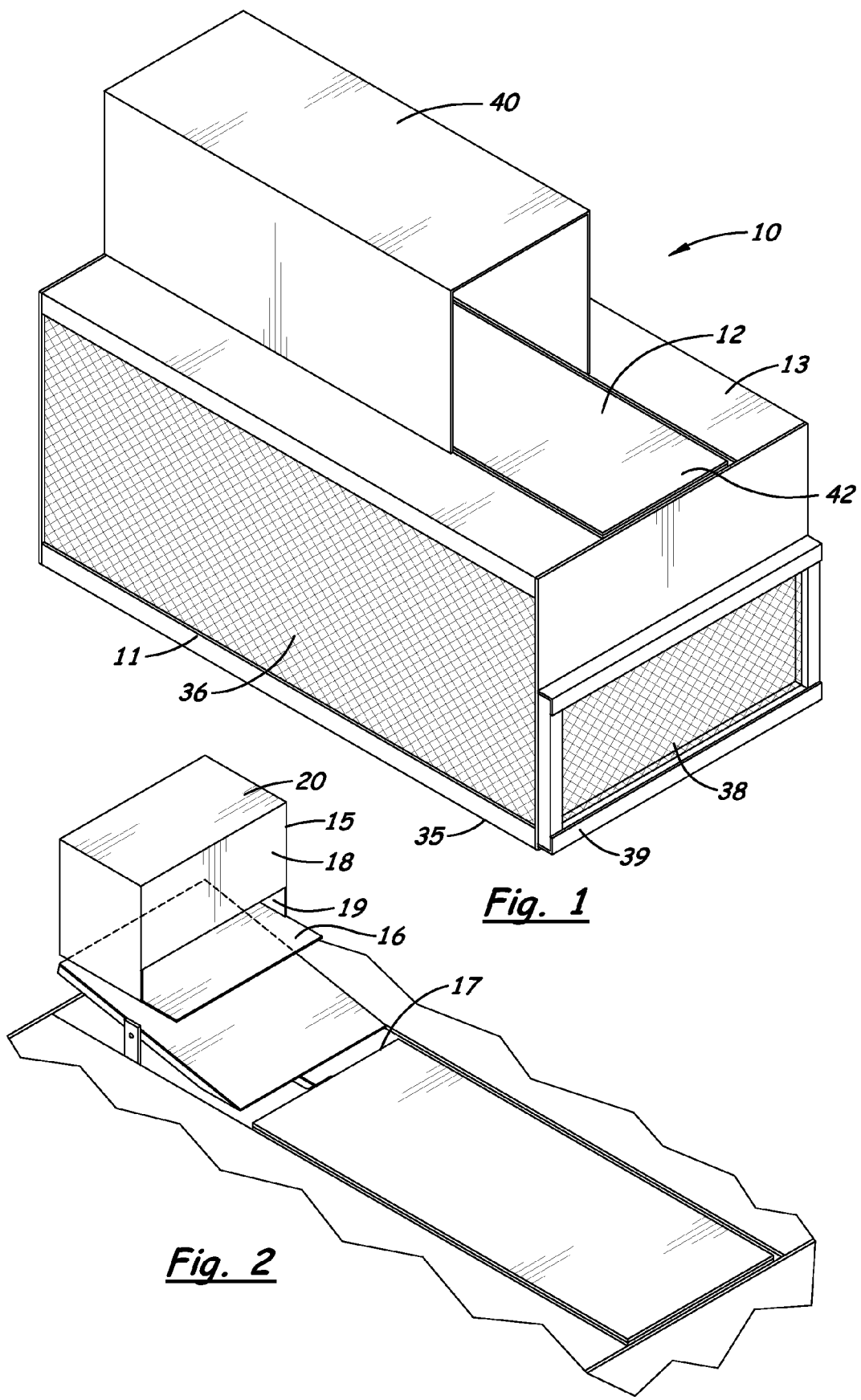

REPEATING LIVE CATCH ANIMAL TRAP

RELATED APPLICATIONS

This application claims the benefit of the Applicant's U.S. Provisional Patent Application No. 61/168,131 filed on Apr. 9, 2009. The content of the Applicant's provisional application is incorporated herein by reference.

BACKGROUND OF THE INVENTION

1. Field of the Invention

The present invention relates to animal traps, and in particular, to a live catch animal trap having the ability to catch multiple animals without requiring human intervention to reset the trap.

2. Description of the Related Art

Animal traps are used to catch animals for a variety of reasons. For example, nuisance animals, such as stray cats, can be caught in traps and relocated or euthanized. For another example, fur bearing animals, such as racoons, possums, and other varmits, can be caught in traps and harvested for their pelts. Live catch traps are commonly used for trapping animals, particularly in areas where non-targeted animals might be caught, or when the targeted animals need to be kept alive.

Live catch traps typically include a cage for holding the trapped animal, and a trigger mechanism designed to be tripped by an animal to cause a door to close behind the animal after it enters the cage. The most common live catch animal traps available on the market for trapping large varmits, such as racoons and possums, are made to catch only one animal at a time. The trapped animal must then be removed and the trap reset before another animal can be caught with the trap.

Automatically resetting rodent traps are known in the prior art. Such traps typically included a trap door located on top of a cage, and a trigger mechanism that automatically reset itself after each rodent was dropped into the cage. For example, such traps are disclosed in U.S. Patent No. 2,763,092 issued to Sheridan, U.S. Pat. No. 2,733,541 issued to McKim, U.S. Pat. No. 2,163,577 issued to Allen, U.S. Pat. No. 1,856,980 issued to Weaver, U.S. Pat. No. 1,810,608 issued to Jacobs, and U.S. Pat. No. 1,798,717 issued to Baranski.

There is a need for an improved animal trap having the ability to catch multiple animals without requiring human intervention to reset the trap.

SUMMARY OF THE INVENTION

An object of the present invention is to provide a live catch animal trap having the ability to catch multiple animals and to automatically reset itself after each animal is caught.

A further object of the present invention is to provide a trigger assembly for an animal trap that provides a smooth and dependable operation when an animal trips the trap, and also when the trap resets itself after an animal is caught.

A further object of the present invention is to provide a live catch animal trap that is economical to manufacture, reliable in operation, and capable of a long operating life.

These and other objects of the present invention are accomplished by providing a live catch animal trap having a trap door positioned above an animal holding cage, a bait station positioned adjacent to the trap door, and a mechanical trigger mechanism. The trap door is rotatably moveable between a generally horizontal closed position and a downwardly inclined open position. The trap door is normally biased toward its closed position by a return spring and/or based on its center of gravity relative to its pivot point. The trigger mechanism is arranged to be tripped by an animal standing on the trap door as the animal attempts to access the bait station. The trigger mechanism has a trip plate connected to a locking element that engages a spring-loaded latch on the trap door. The trip plate and the locking element are arranged to automatically return the trigger mechanism to an untripped condition as the trap door returns from its open position to its closed position.

According to a broad aspect of the present invention, a live catch animal trap is provided, comprising: an animal holding cage; a trap floor positioned above the cage, the trap floor being rotatably mounted and moveable between a generally horizontal closed position and a downwardly inclined open position that causes an animal to slide into the holding cage; a bait station positioned adjacent to the trap floor; and a mechanical trigger mechanism arranged to be tripped by an animal standing on the trap floor as the animal attempts to access the bait station. The trigger mechanism has a first position for holding the trap floor in its closed position and a second position for releasing the trap floor to move to its open position. The trigger mechanism is automatically reset to its first position as the trap floor returns from its open position to its closed position.

According to another broad aspect of the present invention, a live catch animal trap is provided, comprising: an animal holding cage; a trap floor positioned above the cage, the trap floor being rotatably moveable between a generally horizontal closed position and a downwardly inclined open position, the trap floor being biased toward the closed position; a spring-loaded latch connected to the trap floor, the spring-loaded latch comprising a latch pin extending generally parallel with a rotation axis of the trap floor and a spring assembly that biases the latch pin in a first direction; a bait station positioned adjacent to the trap floor; and a mechanical trigger mechanism arranged to be tripped by an animal standing on the trap floor as the animal attempts to access the bait station. The trigger mechanism comprises a trip plate and a locking element that cooperates with the spring-loaded latch. The locking element comprises a bevel face for engaging the latch pin as the trap floor moves from its open position to its closed position. The trip plate is mounted for movement between an untripped position and a tripped position and is mechanically connected to the locking element to move the locking element between a first position for engaging the latch pin for holding the trap floor in its closed position and a second position for disengaging the latch pin for releasing the trap floor to move to its inclined open position. The trip plate and the locking element are arranged to automatically return the trigger mechanism to an untripped condition as the trap floor returns from its open position to its closed position.

Numerous other objects of the present invention will be apparent to those skilled in this art from the following description wherein there is shown and described an example embodiment of the present invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings:

FIG. 1 is a perspective view of a live catch animal trap according to the present invention.

FIG. 2 is a cutaway perspective view of part of the animal trap shown in FIG. 1.

DETAILED DESCRIPTION OF THE INVENTION

An animal trap 10 according to the present invention will be explained in detail with reference to FIGS. 1 to 10 of the accompanying drawings.

Figure 3:
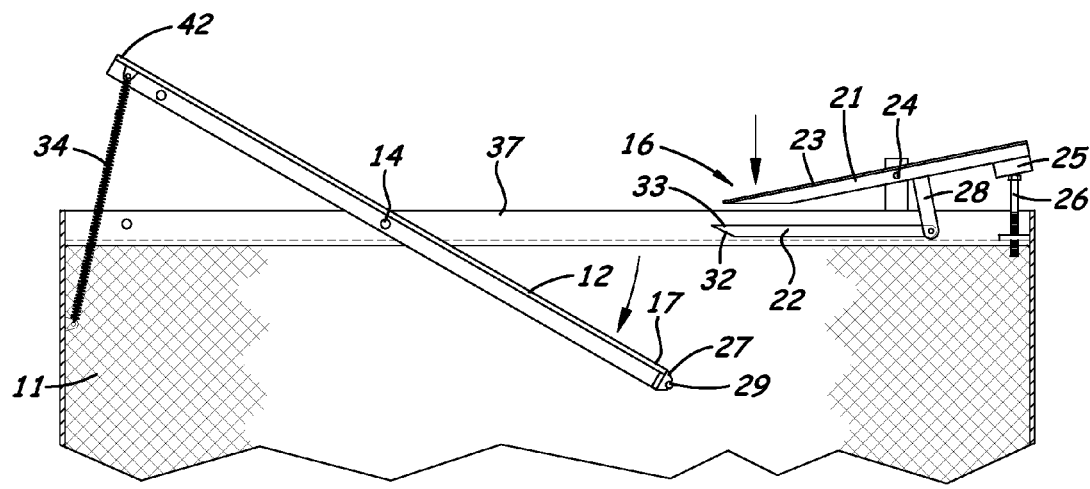
FIG. 3 is a cross section view of the trap door and trigger mechanism used in the animal trap shown in FIG. 1.
Figure 4:
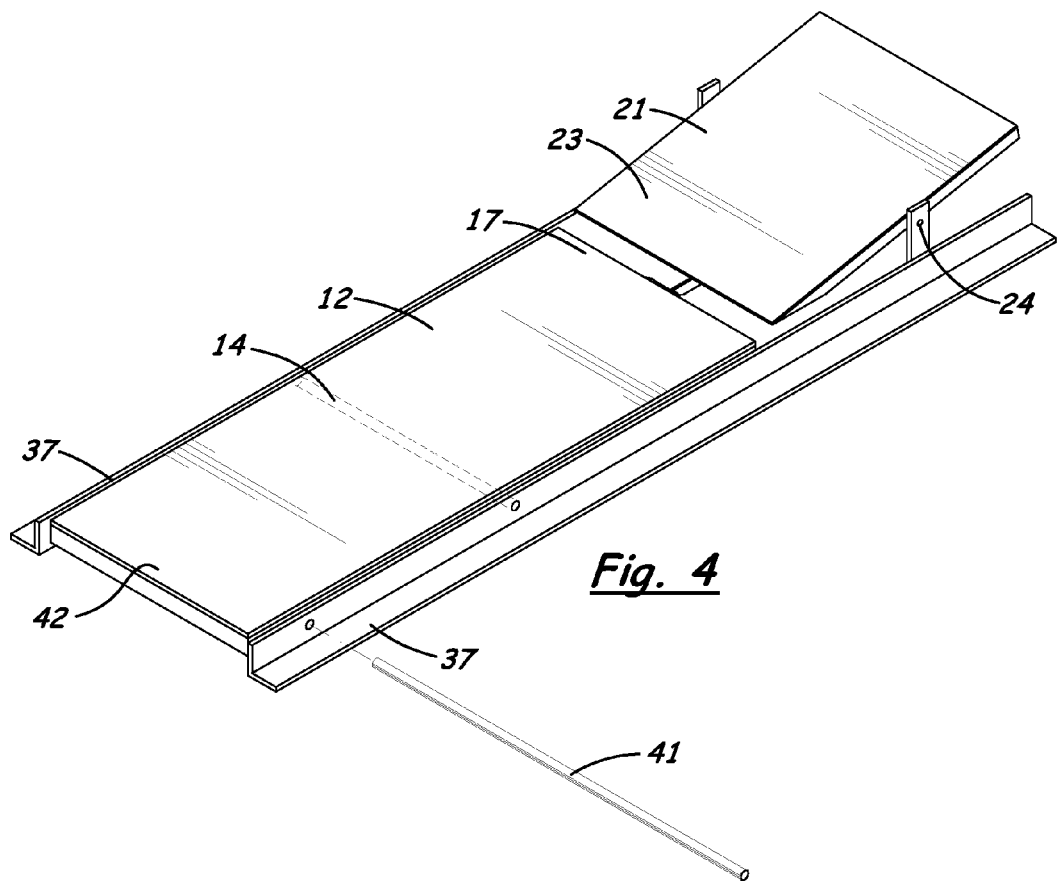
FIG. 4 is a perspective view of the trap door and trigger mechanism shown in FIG. 3.
Figure 5:
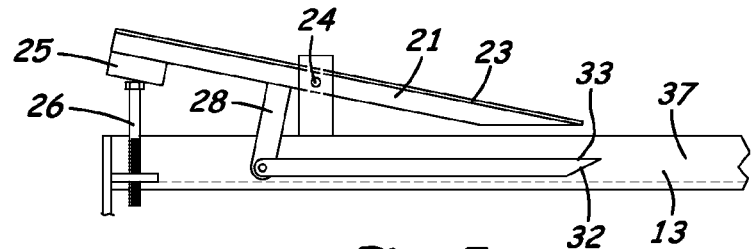
FIG. 5 is a detail cross section view of the trigger mechanism used in the animal trap shown in FIG. 1.
Figure 6:
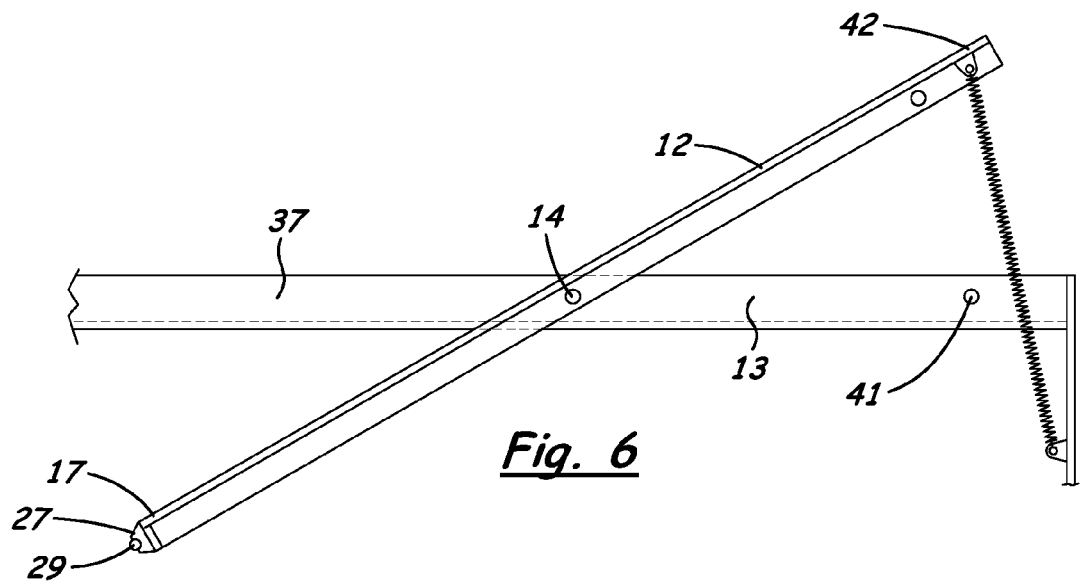
FIG. 6 is a detail cross section view of the trap door used in the animal trap shown in FIG. 1.
Figure 7:
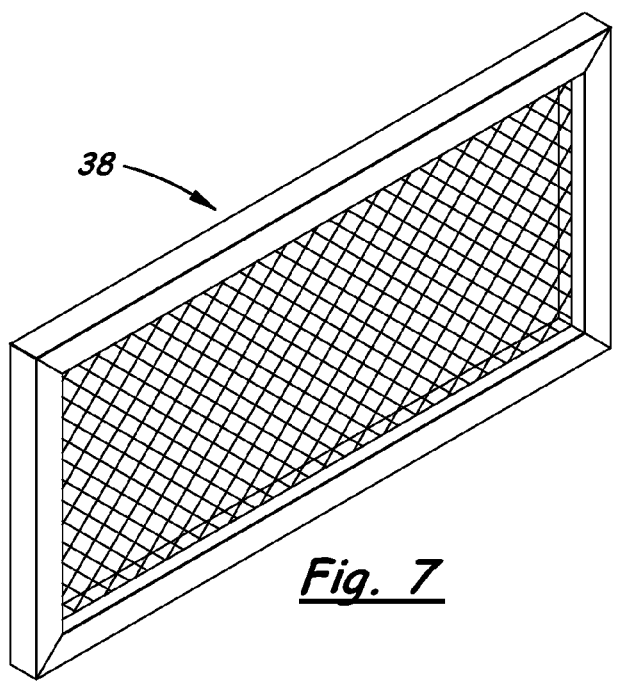
FIG. 7 is a perspective view of a release door for the animal holding cage of the trap shown in FIG. 1.
Figure 8:
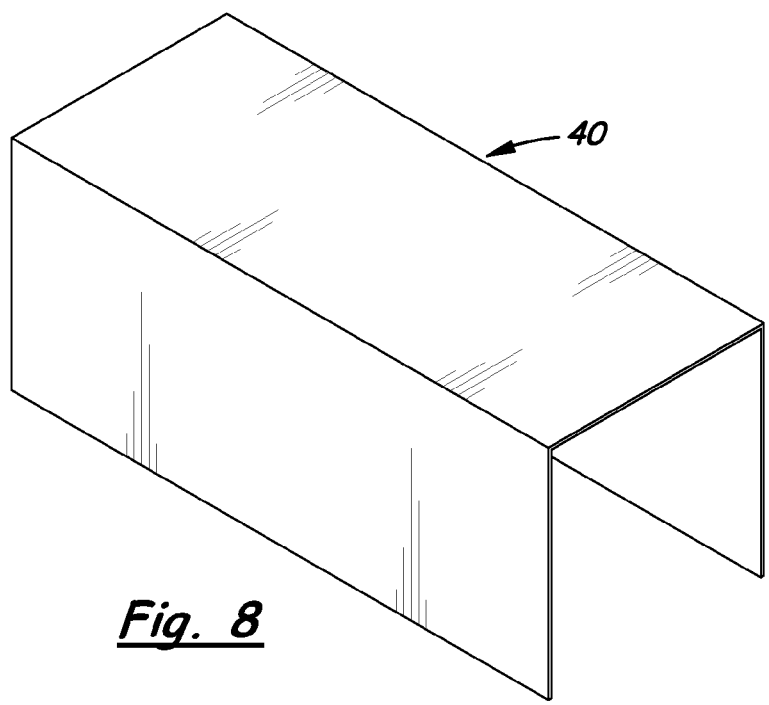
FIG. 8 is a perspective view of a cover that covers the bait bin and trigger mechanism of the animal trap shown in FIG. 1.
Figure 9:
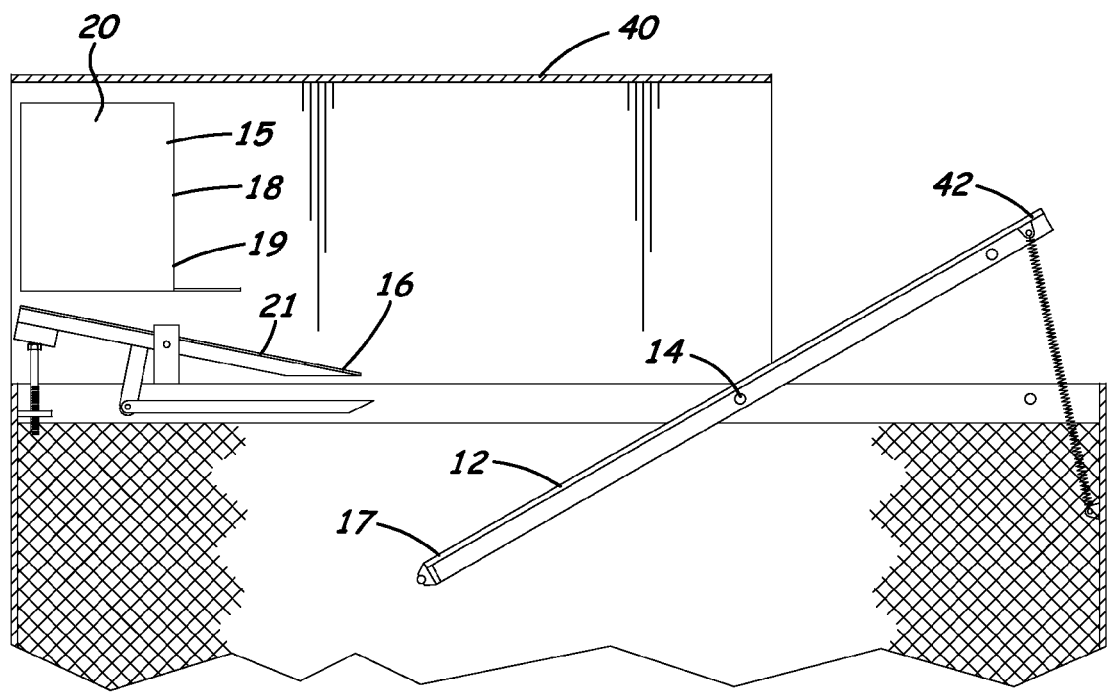
FIG. 9 is a cross section elevation view illustrating the bait bin, trigger mechanism and trap door components of the animal trap shown in FIG. 1.
Figure 10:
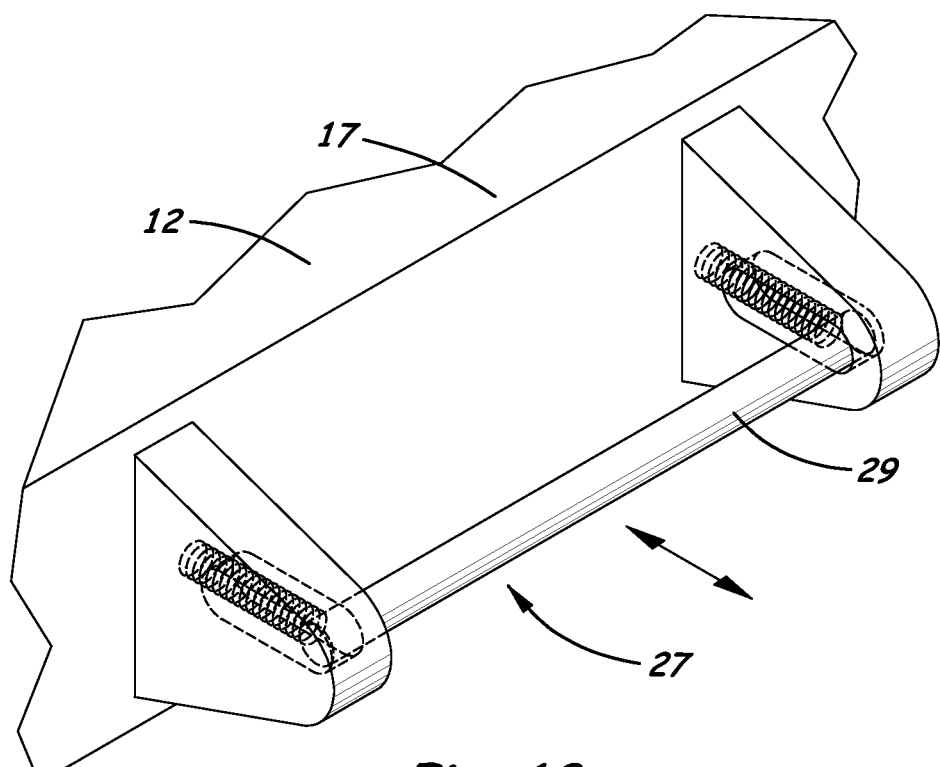
FIG. 10 is a perspective view of a latch element for the trigger mechanism of the animal trap shown in FIG. 1.

The animal trap 10 according to the present invention includes an animal holding cage 11 with a trap door 12 positioned on a top 13 of the cage 11. The trap door 12 is rotatably mounted for movement about a pivot axis 14 between a generally horizontal closed position, as shown in FIGS. 1, 2, and 4, and a downwardly inclined open position, as shown in FIGS. 3, 6 and 9. For example, the trap door 12 can be downwardly inclined in its open position at a 40 to 80 degree angle from horizontal to cause an animal to slide into the holding cage 11.

A bait station 15 and a mechanical trigger mechanism 16 are positioned adjacent to a front end 17 of the trap door 12. The bait station 15 includes a bait bin 18 with a limited access opening 19 for allowing an animal located on the trap door 12 to gain access to a bait, such as pet food, canned fish, or the like. The bait bin 18 has an open top side 20 to allow the bait to be replenished as needed from time-to-time.

The trigger mechanism 16 includes a trip plate 21 and a locking element 22 that are moveable between a first position (FIG. 2) for holding the trap door 12 in its closed position and a second position (FIGS. 3, 4, 5 and 9) for releasing the trap door 12 to move to its open position. The trigger mechanism 16 is arranged to be automatically reset to its first position as the trap door 12 returns from its open position to its closed position.

The trip plate 21 has an exposed portion 23 arranged between the trap door 12 and the access opening 19 of the bait station 15. This arrangement of the trip plate 21 encourages an animal to trip the trip plate 21 when attempting to access the bait station 15. The trip plate 21 is rotatably moveable about a pivot axis 24 between an untripped position and a tripped position when an animal applies a vertical force to an upper surface of the exposed portion 23 of the trip plate 21 while attempting to access the bait station 15. A suitable biasing means, such as a counterweight 25 or return spring, is used to bias the trip plate 21 toward its untripped position to automatically reset the trigger mechanism 16. An adjustable stop 26 is arranged to engage the trip plate 21 to adjust a sensitivity of the trigger mechanism 16.

The trip plate 21 is mechanically connected to the locking element 22 to move the locking element 22 in a substantially horizontal direction into and out of engagement with a latch element 27 on the trap door 12 upon movement of the trip plate 21. The trip plate 21 is connected to the locking element 22 by an arm 28 that extends below the pivot axis 24 of the trip plate 21. The arrangement of the trip plate 21, arm 28, and locking element 22 is such that a downward force on the exposed portion 23 of the trip plate 21 causes the trip plate 21 to rotate downwardly and the locking element 22 to slide in a substantially horizontal direction away from the latch element 27.

The latch element 27 is a spring-loaded latch assembly having a latch pin 29 extending in a plane that is substantially parallel with, or coplanar with, a plane of the trap door 12. For example, the latch pin 29 can be located on a front end 17 of the trap door 12 and extend generally parallel with the rotation axis 14 of the trap door 12. The spring loading of the latch pin 29 is arranged to bias the latch pin 29 toward the locking element 22 of the trigger mechanism 16.

The locking element 22 has a bevel face 32 for engaging the latch pin 29 as the trap door 12 moves from its open position to its closed position. The bevel face 32 facilitates movement of the trigger mechanism 16 into its armed, untripped position with the latch pin 29 resting on a top surface 33 of the locking element 22. The bevel face 32 causes the latch pin 29 to move inwardly against its spring bias until the latch pin 29 snaps into position over the top surface 33 of the locking element 22. The return movement of the latch pin 29 causes the latch pin 29 to engage the top surface 33 of the locking element 22 to hold the trap door 12 in its closed position.

The bevel face 32 can also cause the locking element 22 itself to move in a direction away from the latch pin 29 until the latch pin 29 is positioned above the top surface 33 of the locking element 22. In this case, the combined movements of the latch pin 29 and the locking element 22 work together to reset the trigger mechanism 16 as the trap door 12 moves to its closed position.

The trap door 12 is biased toward its closed position by a return spring 34 and/or by locating the pivot axis 14 for the trap door 12 between a center of gravity of the trap door 12 and the front end 17 of the trap door 12. By having the center of gravity behind the pivot axis 14, the gravitational force will bias the trap door 12 to rotate about its pivot axis 14 into its closed position. The return spring 34 provides an additional force to bias the trap door 12 toward its closed position.

The holding cage 11 can be made in a variety of shapes and sizes. For example, the holding cage 11 can be a rectangular prism-shaped cage having a bottom 35, four sides 36, and the top 13. Frame members 37 can be provided across the top 13 of the cage to support the trap door 12, bait station 15 and trigger mechanism 16. A release door 38 can be provided across one of the sides to allow animals to be conveniently released from the trap 10 by a human operator. For example, the release door 38 can be made to slide into channel members 39 so that it can be easily removed to open the holding cage 11. A suitable locking mechanism can be provided to hold the release door 38 in place.

A cover 40 is positioned over the bait station 15, the trigger mechanism 16, and at least the front part of the trap door 12. The cover 40 functions as a funnel to guide animals into the trap 10 so that the animals are supported on the trap door 12 as they access the bait station 15 and engage the trigger mechanism 16. When the trigger mechanism 16 is tripped and the trap door 12 falls to its open position, the cover 40 prevents the animals from jumping off to the side of the trap door 12 or grabbing hold of something that would keep them from falling into the cage 11. The cover 40 has a substantially smooth inner surface that cannot be used by an animal to prevent it from falling into the cage 11. The cover 40 also functions to protect the bait station 15, trigger mechanism 16, and trap door 12 from snow, rain, or other weather events that might spoil the bait or otherwise interfere with the operation of the trap 10. For example, the cover 40 can be made of a light gauge metal having vertical side walls and a ceiling that extends over the top of the trap 10.

A control rod 41 (FIG. 6) can be provided for holding the trap door 12 in its closed position to disable the trap 10 when the trap is not being used or when the trap is being transported. For example, the control rod 41 can be arranged to extend across the top 13 of the holding cage 11 to engage a rear edge 42 of the trap door 12 to prevent the trap door 12 from pivoting to its inclined open position. The control rod 41 can be easily removed to make the trap 10 operable.

The animal trap 10 described herein operates by enticing animals to attempt to obtain the bait contained in the bait station 15. An animal attempting to access the bait will stand or sit or otherwise be present on the trap door 12 with a majority of its body weight supported by the trap door 12 between the pivot axis 14 of the trap door 12 and the latch element 27 at the front end 17 of the trap door 12. The exposed portion 23 of the trip plate 21 is positioned between the trap door 12 and the bait station 15 so that an animal will tend to press on the trip plate 21, e.g., with its front feet or its face.

When the trip plate 21 is pressed downwardly, the locking element 22 moves out of engagement with the latch element 27. The combined center of gravity of the trap door 12 and the animal is located in front of the pivot axis 14 of the trap door 12, thereby causing the trap door 12 to fall into its downwardly inclined, open position. The animal then slides off the smooth upper surface of the trap door 12 into the animal holding cage 11. Once the animal is off of the trap door 12, the trap door 12 automatically pivots back to its closed position due to the force of the return spring 34 and/or the center of gravity of the trap door 12 being located behind the pivot axis 14.

As the trap door 12 moves to its closed position, the bevel face 32 of the locking element 22 engages the spring-loaded latch pin 29 and causes the latch pin 29 to displace against its spring force until it can snap into position over the top surface 33 of the locking element 22. At this point, the trap 10 is once again set with the trip plate 21 in its untripped position and the trap door 12 in its closed position, thereby retaining the animal in the holding cage 12 and being ready to catch additional animals in the same manner as the first animal was caught. When the trap 10 is checked by a human operator, the release door 38 can be slid open or removed to easily release the animal or animals from the holding cage 11.

While the invention has been specifically described in connection with specific embodiments thereof, it is to be understood that this is by way of illustration and not of limitation, and the scope of the appended claims should be construed as broadly as the prior art will permit.

What is claimed is:

1. A live catch animal trap, comprising:
   an animal holding cage;
   a trap floor positioned above said cage, said trap floor being rotatably mounted and moveable between a generally horizontal closed position and a downwardly inclined open position that causes an animal to slide into said holding cage;
   a bait station positioned adjacent to said trap floor; and
   a mechanical trigger mechanism arranged to be tripped by an animal standing on said trap floor as the animal attempts to access said bait station, said trigger mechanism having a first position for holding said trap floor in its closed position, and a second position for releasing said trap floor to move to its open position, said trigger mechanism being automatically reset to said first position as said trap floor returns from its open position to its closed position;
   further comprising a spring-loaded latch connected to said trap floor, wherein said mechanical trigger mechanism comprises a locking element arranged to engage said spring-loaded latch;
   wherein said locking element comprises a bevel face for engaging said spring-loaded latch as said trap floor moves from its open position to its closed position, whereby said bevel face facilitates movement of said trigger mechanism into its first position;
   wherein said spring-loaded latch comprises a latch pin extending generally parallel with a rotation axis of said trap floor, and a spring assembly that biases said latch pin toward the locking element of the trigger mechanism; and
   wherein said bevel face of said locking element is arranged to engage said latch pin as the trap floor moves from its open position to its closed position, thereby causing said latch pin to move inwardly against the biasing force of its spring assembly until said latch pin clears said bevel face and snaps into position over a top surface of said locking element.

2. The animal trap according to claim 1, wherein said mechanical trigger mechanism comprises a trip plate mechanically connected to said locking element to move said locking element into and out of engagement with said latch element on said trap floor upon movement of said trip plate.

3. The animal trap according to claim 2, wherein said trip plate is rotatably mounted and arranged to receive a vertical force from an animal attempting to access said bait station, and wherein said locking element is mechanically connected to said trip plate and arranged to move in a substantially horizontal direction into and out of engagement with said latch element upon movement of said trip plate.

4. The animal trap according to claim 3, wherein said trip plate is rotatably mounted for movement between an untripped position and a tripped position, and further comprising a means for biasing said trip plate from said tripped position to said untripped position to automatically reset said trigger mechanism.

5. The animal trap according to claim 4, wherein said biasing means comprises a counterweight associated with said trip plate to bias said trip plate toward said untripped position.

6. The animal trap according to claim 4, further comprising an adjustable stop arranged to engage said trip plate to adjust a sensitivity of said trigger mechanism.

7. A live catch animal trap, comprising:
   an animal holding cage;
   a trap floor positioned above said cage, said trap floor being rotatably mounted and moveable between a generally horizontal closed position and a downwardly inclined open position that causes an animal to slide into said holding cage;
   a bait station positioned adjacent to said trap floor;
   a mechanical trigger mechanism arranged to be tripped by an animal standing on said trap floor as the animal attempts to access said bait station, said trigger mechanism having a first position for holding said trap floor in its closed position, and a second position for releasing said trap floor to move to its open position, said trigger mechanism being automatically reset to said first position as said trap floor returns from its open position to its closed position; and a control rod separate from said trigger mechanism for holding said trap floor in said closed position to disable said trap.

8. The animal trap according to claim 1, wherein said trap floor is downwardly inclined at a 40 to 80 degree angle from horizontal in its open position.

9. The animal trap according to claim 1, further comprising a means for biasing said trap floor to rotate from its open position to its closed position.

10. The animal trap according to claim 9, wherein said biasing means comprises a return spring associated with said trap floor to bias said trap floor toward said closed position.

11. The animal trap according to claim 1, wherein said bait station has a hopper and a limited access opening that encourages an animal to step on a trip plate of said trigger mechanism to access bait.

12. The animal trap according to claim 1, further comprising a cover positioned over said bait station, said trigger mechanism, and at least a portion of said trap floor.

13. The animal trap according to claim 1, wherein said holding cage comprises an access door for releasing animals caught in said trap.

14. The animal trap according to claim 1, wherein said trap floor is rotatably mounted about a generally horizontal pivot axis for movement between its closed and open positions, and wherein said pivot axis is arranged to be located behind a center of gravity of an animal standing on said trap door attempting to access said bait station.

15. The animal trap according to claim 1, wherein said trap floor has a smooth upper surface that causes an animal to slide down into the holding cage when the trap floor is moved to its open position.

16. A live catch animal trap, comprising:

an animal holding cage;

a trap floor positioned above said cage, said trap floor being rotatably moveable between a generally horizontal closed position and a downwardly inclined open position, said trap floor being biased toward said closed position;

a spring-loaded latch connected to said trap floor, said spring-loaded latch comprising a latch pin extending generally parallel with a rotation axis of said trap floor and a spring assembly that biases said latch pin in a first direction;

a bait station positioned adjacent to said trap floor; and a mechanical trigger mechanism arranged to be tripped by an animal standing on said trap floor as the animal attempts to access said bait station, said trigger mechanism comprising a trip plate and a locking element that cooperates with said spring-loaded latch, said locking element comprises a bevel face for engaging said latch pin as said trap floor moves from its open position to its closed position;

said trip plate being mounted for movement between an untripped position and a tripped position, said trip plate being mechanically connected to said locking element to move said locking element between a first position for engaging said latch pin for holding said trap floor in its closed position and a second position for disengaging said latch pin for releasing said trap floor to move to its inclined open position, said trip plate and said locking element being arranged to automatically return said trigger mechanism to an untripped condition as said trap floor returns from its open position to its closed position.

* * * * *